US007736762B2

(12) United States Patent
Uriu et al.

(10) Patent No.: US 7,736,762 B2
(45) Date of Patent: Jun. 15, 2010

(54) PLASMA DISPLAY PANEL

(75) Inventors: Eiichi Uriu, Osaka (JP); Hatsumi Komaki, Osaka (JP); Shingo Takagi, Osaka (JP); Akira Kawase, Osaka (JP); Tatsuo Mifune, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 11/791,024

(22) PCT Filed: Sep. 28, 2006

(86) PCT No.: PCT/JP2006/319320

§ 371 (c)(1),
(2), (4) Date: May 18, 2007

(87) PCT Pub. No.: WO2007/040142

PCT Pub. Date: Apr. 12, 2007

(65) Prior Publication Data

US 2008/0150428 A1 Jun. 26, 2008

(30) Foreign Application Priority Data

Oct. 3, 2005 (JP) ............................ 2005-289787

(51) Int. Cl.
*B32B 15/04* (2006.01)

(52) U.S. Cl. ...................................... 428/701; 428/690

(58) Field of Classification Search ................. 428/428, 428/432, 690, 697, 702; 430/320; 501/32
See application file for complete search history.

(56) References Cited

U.S. PATENT DOCUMENTS 6,207,268 B1 * 3/2001 Kosaka et al. ............... 428/325
7,105,256 B2 9/2006 Fukushima
7,326,666 B2 2/2008 Yamamoto et al.
2002/0175622 A1 * 11/2002 Otani et al. ................. 313/518
2003/0108753 A1 6/2003 Fujii et al.
2003/0129546 A1 * 7/2003 Mitsui et al. ................ 430/320
2003/0228471 A1 12/2003 Hayakawa et al.
2004/0232840 A1 * 11/2004 Aoki et al. .................. 313/582
2005/0089794 A1 4/2005 Fukushima
2005/0104520 A1 * 5/2005 Hong et al. ................. 313/582

FOREIGN PATENT DOCUMENTS

CN 1585040 A 2/2005

(Continued)

OTHER PUBLICATIONS

Hiroi English machine translation.*

(Continued)

*Primary Examiner*—Jennifer C McNeil
*Assistant Examiner*—Lauren Robinson
(74) *Attorney, Agent, or Firm*—McDermott Will & Emery LLP

(57) ABSTRACT

A plasma display panel (PDP) is made of front panel (2) and a rear panel. The front panel includes display electrodes (6), dielectric layer (8), and protective layer (8) that are formed on front glass substrate (3). The rear panel includes electrodes, barrier ribs, and phosphor layers that are formed on a rear glass substrate. The front panel and the rear panel are faced with each other, and the peripheries thereof are sealed to form a discharge space therebetween. Display electrodes (6) includes metal electrodes (4*b*, 5*b*) each containing at least silver and binding glass. The binding glass of black electrodes (41*b*, 51*b*) and white electrodes (42*b*, 52*b*) constituting metal bus electrodes (4*b*, 5*b*) contains at least bismuth oxide and has a softening point exceeding 550° C.

1 Claim, 1 Drawing Sheet

FOREIGN PATENT DOCUMENTS

| | | | |
|---|---|---|---|
| JP | 5-217421 | A | 8/1993 |
| JP | 9-50769 | A | 2/1997 |
| JP | 10-144212 | | 5/1998 |
| JP | 11-317170 | A | 11/1999 |
| JP | 2000-30531 | A | 1/2000 |
| JP | 2000-48645 | A | 2/2000 |
| JP | 2001-48577 | A | 2/2001 |
| JP | 2002-53342 | A | 2/2002 |
| JP | 2003-128430 | A | 5/2003 |
| JP | 2003-131365 | A | 5/2003 |
| JP | 2003-128430 | * | 8/2003 |
| JP | 2003-226549 | | 8/2003 |
| JP | 2004-284934 | A | 10/2004 |
| JP | 2005-070079 | | 3/2005 |
| JP | 2005-70079 | A | 3/2005 |
| KR | 10-2005-0043711 | | 5/2005 |

OTHER PUBLICATIONS

Korean Office Action, issued in Korean Patent Application No. KR 10-2007-7017384 dated on Dec. 31, 2008.

Chinese Office Action issued in Chinese Patent Application No. CN 2006800036401 dated Mar. 27, 2009.

European Search Report issued in European Patent Application No. 06810767.1-2208, mailed Jan. 29, 2010.

* cited by examiner

PLASMA DISPLAY PANEL

RELATED APPLICATIONS

This application is the U.S. National Phase under 35 U.S.C. §371 of International Application No. PCT/JP200/319320, filed on Sep. 28, 2006, which in turn claims the benefit of Japanese Application No. 2005-289787, filed on Oct. 3, 2005, the disclosures of which Applications are incorporated by reference herein.

TECHNICAL FIELD

The present invention relates to a plasma display panel for use in a display device and the like.

BACKGROUND ART

A plasma display panel (herein after referred to as a PDP) can achieve higher definition and have a larger screen. Thus, a television screen using a PDP approx. 65 inch in diagonal is commercially available. Recently, with advancement of application of PDPs to full-spec high definition televisions having scanning lines at least twice as many as conventional televisions compliant with the National Television System Committee (NTSC) system, PDPs containing no lead to address environmental issues have been required.

A PDP is basically made of a front panel and a rear panel. The front panel includes a glass substrate made of sodium borosilicate glass by the float method, display electrodes that are made of stripe-like transparent electrodes and bus electrodes formed on the principle surface of the glass substrate on one side thereof, a dielectric layer covering the display electrodes and working as a capacitor, and a protective layer that is made of magnesium oxide (MgO) formed on the dielectric layer. On the other hand, the rear panel is made of a glass substrate, stripe-like address electrodes formed on the principle surface of the glass substrate on one side thereof, a primary dielectric layer covering the address electrodes, barrier ribs formed on the primary dielectric layer, and phosphor layers formed between the respective barrier ribs and emitting light in red, green, or blue.

The front panel and rear panel are hermetically sealed with the electrode-forming sides thereof faced with each other. A Ne—Xe discharge gas is charged in the discharge space partitioned by the barrier ribs, at a pressure ranging from 400 to 600 Torr. For a PDP, selective application of image signal voltage to the display electrodes makes the electrodes discharge. Then, the ultraviolet light generated by the discharge excites the respective phosphor layers so that they emit light in red, green, or blue to display color images.

Silver electrodes are used for the bus electrodes in the display electrodes to ensure electrical conductivity thereof. Low-melting glass essentially consisting of lead oxide is used for the dielectric layer. The examples of a lead-free dielectric layer addressing recent environmental issues are disclosed in Japanese Patent Unexamined Publication Nos. 2003-128430, 2002-053342, 2001-048577, and H09-050769.

Further, an example of binding glass containing a predetermined quantity of bismuth oxide for forming electrodes is disclosed in Japanese Patent Unexamined Publication No. 2000-048645.

Such compliance of a PDP with high definition increases the numbers of scanning lines and display electrodes, and decreases the spacing between the display electrodes. These changes increase silver ions diffused into the dielectric layer and glass substrate, from the silver electrodes constituting the display electrodes. When the silver ions diffuse into the dielectric layer and glass substrate, the silver ions are reduced by alkali metal ions in the dielectric layer, and bivalent tin ions contained in the glass substrate, thus forming silver colloids. These colloids cause a yellowing phenomenon in which the dielectric layer or glass substrate colors into yellow or brown. Additionally, the silver oxide reduced generates oxygen, thus bubbles in the dielectric layer.

Thus, an increase in the number of scanning lines more conspicuously yellows the glass substrate and generates bubbles in the dielectric layer, thus significantly degrading the image quality and causing insulation failures in the dielectric layer.

However, in the examples of the conventional lead-free dielectric layer and binding glass in the electrodes proposed to address environmental issues, the yellowing phenomenon and insulation failures of the dielectric layer cannot be inhibited at the same time.

SUMMARY OF THE INVENTION

A plasma display panel (PDP) of the present invention is made of a front panel and a rear panel. The front panel includes display electrodes, a dielectric layer, and a protective layer that are formed on a glass substrate. The rear panel includes address electrodes, barrier ribs, and phosphor layers that are formed on a substrate. The front panel and the rear panel are faced with each other, and the peripheries thereof are sealed to form a discharge space therebetween. Each of the display electrodes includes a metal electrode containing at least silver and binding glass. The binding glass of the metal electrode contains at least bismuth oxide and has a softening point exceeding 550° C.

Such a structure can provide an echo-friendly PDP with high visible-light transmittance and high image display quality that includes a dielectric layer having a minimized yellowing phenomenon and dielectric strength deterioration.

REFERENCE MARKS IN THE DRAWINGS

Figure 1:
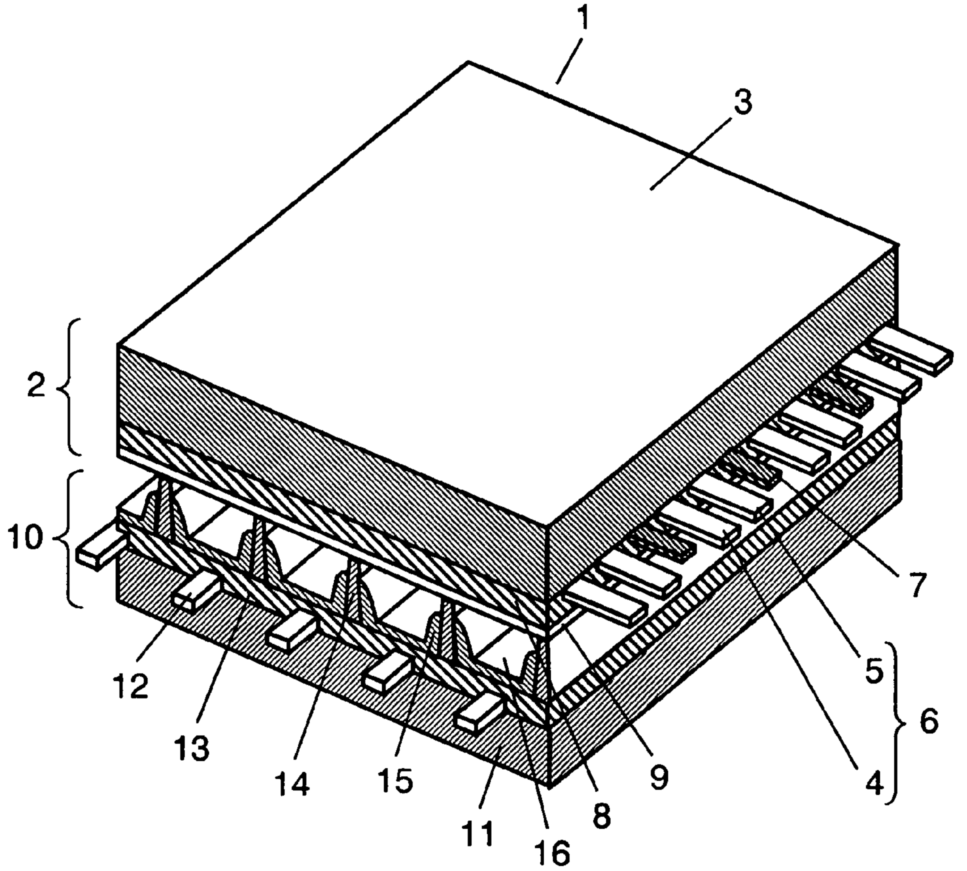
FIG. 1 is a perspective view illustrating a structure of a plasma display panel (PDP) in accordance with an exemplary embodiment of the present invention.

1 Plasma display panel (PDP)
2 Front panel
3 Front glass substrate
4 Scan electrode
4*a*, 5*a* Transparent electrode
4*b*, 5*b* Metal bus electrode (metal electrode)
5 Sustain electrode
6 Display electrode
7 Black stripe (lightproof layer)
8 Dielectric layer
9 Protective layer
10 Rear panel
11 Rear glass substrate
12 Address electrode
13 Primary dielectric layer
14 Barrier rib
15 Phosphor layer
16 Discharge space

41*b*, 51*b* Black electrode
42*b*, 52*b* White electrode
81 First dielectric layer
82 Second dielectric layer

DETAILED DESCRIPTION OF PREFERRED EMBODIMENT

Hereinafter, a description is provided of a plasma display panel (PDP) in accordance with the exemplary embodiment of the present invention, with reference to the accompanying drawings.

Exemplary Embodiment

FIG. 1 is a perspective view illustrating a structure of a PDP in accordance with the exemplary embodiment of the present invention. The PDP is similar to a general alternating-current surface-discharge PDP in basic structure. As shown in FIG. 1, for PDP 1, front panel 2 including front glass substrate 3, and rear panel 10 including rear glass substrate 11 are faced with each other, and the outer peripheries thereof are hermetically sealed with a sealing material including glass frits. Into discharge space 16 in sealed PDP 1, a discharge gas including Ne and Xe is charged at a pressure ranging from 400 to 600 Torr.

On front glass substrate 3 of front panel 2, a plurality of rows of display electrodes 6, each made of a pair of stripe-like scan electrode 4 and sustain electrode 5, and black stripes (lightproof layers) 7 are disposed in parallel with each other. Formed on front glass substrate 3 is dielectric layer 8 that covers display electrodes 6 and lightproof layers 7 and works as a capacitor. Further on the surface of the dielectric layer, protective layer 9 including magnesium oxide (MgO) is formed.

On rear glass substrate 11 of rear panel 10, a plurality of stripe-like address electrodes 12 are disposed in parallel with each other in the direction orthogonal to scan electrodes 4 and sustain electrodes 5 of front panel 2. Primary dielectric layer 13 coats the address electrodes. Further, on primary dielectric layer 13 between address electrodes 12, barrier ribs 14 having a predetermined height are formed to partition discharge space 16. Phosphor layers 15 are sequentially applied to the grooves between barrier ribs 14 so that ultraviolet light excites the phosphor layers to emit light in red, blue, or green for each address electrode 12. Discharge cells are formed in the positions where scan electrodes 4 and sustain electrodes 5 intersect with address electrodes 12. The discharge cells that include phosphor layers 15 in red, blue, and green, and are arranged in the direction of display electrodes 6 form pixels for color display.

Figure 2:
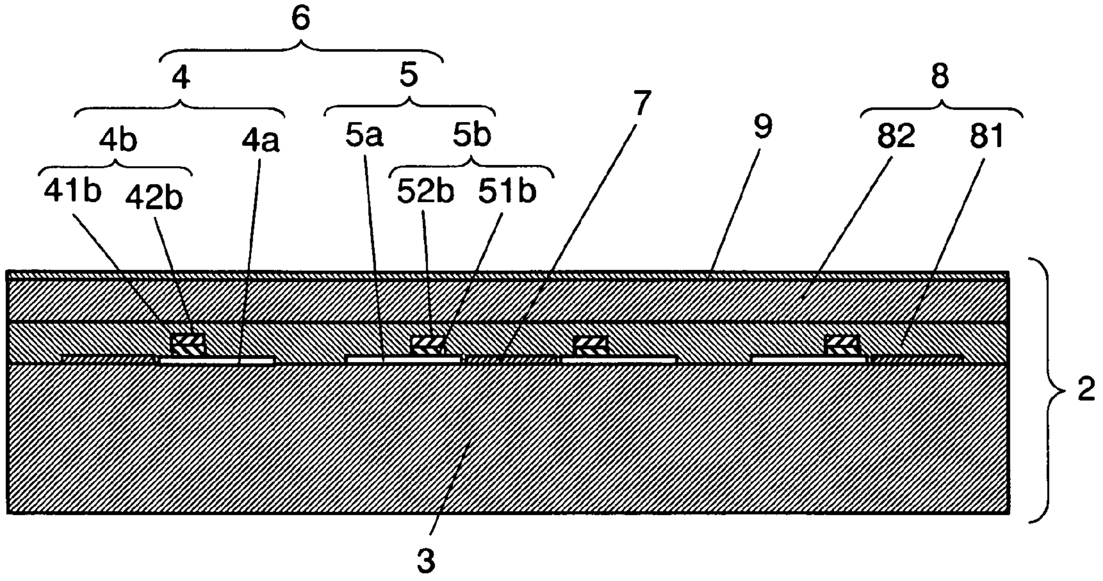
FIG. 2 is a sectional view illustrating a structure of a front panel of the PDP in accordance with the exemplary embodiment of the present invention.

FIG. 2 is a sectional view illustrating a structure of front panel 2 of PDP 1 in accordance with the exemplary embodiment of the present invention. FIG. 2 shows a vertically inverted view of FIG. 1. As shown in FIG. 2, display electrodes 6, each made of scan electrode 4 and sustain electrode 5, and black stripes 7 are patterned on front glass substrate 3 made by the float method or the like. Scan electrodes 4 and sustain electrodes 5 include transparent electrodes 4*a* and 5*a* made of indium oxide (ITO) or tin oxide ($SnO_2$), and metal bus electrodes 4*b* and 5*b*, i.e. metal electrodes formed on transparent electrodes 4*a* and 5*a*, respectively. Metal bus electrodes 4*b* and 5*b* are used to impart electrical conductivity to transparent electrodes 4*a* and 5*a* in the longitudinal direction thereof, and made of a conductive material essentially consisting of silver (Ag) material. Further, metal bus electrodes 4*b* and 5*b* are made of black electrodes 41*b* and 51*b*, and white electrodes 42*b* and 52*b*, respectively.

Dielectric layer 8 is structured of at least two layers: first dielectric layer 81 that covers these transparent electrodes 4*a* and 5*a*, metal bus electrodes 4*b* and 5*b*, and black stripes 7 formed on front glass substrate 3; and second dielectric layer 82 formed on first dielectric layer 81. Further, protective layer 9 is formed on second dielectric layer 82.

Next, a description is provided of a method of manufacturing a PDP. First, scan electrodes 4, sustain electrodes 5, and lightproof layers 7 are formed on front glass substrate 3. These transparent electrodes 4*a* and 5*a* and metal bus electrodes 4*b* and 5*b* are patterned by methods including the photolithography method. Transparent electrodes 4*a* and 5*a* are formed by the thin film process or the like. Metal bus electrodes 4*b* and 5*b* are solidified by firing a paste containing conductive black particles or a silver (Ag) material, at a predetermined temperature. Black strips 7 are formed by the similar method. A paste containing a black pigment is silk-screened, or a black pigment is applied to the entire surface of the glass substrate and patterned by the photolithography method. Then, the paste or the pigment is fired.

Next, a dielectric paste is applied to front glass substrate 3 to cover scan electrodes 4, sustain electrodes 5, and lightproof layers 7 by the die coat method or the like, to form a dielectric paste layer (dielectric material layer). Leaving the dielectric paste for a predetermined period after application levels the surface of the applied dielectric paste and provides a flat surface. Thereafter, solidifying the dielectric paste layer by firing forms dielectric layer 8 that covers scan electrodes 4, sustain electrodes 5, and lightproof layers 7. In this exemplary embodiment of the present invention, repeating these steps of applying the dielectric paste forms dielectric layer 8 structured of two layers: first dielectric layer 1 and second dielectric layer 82. The dielectric paste is a paint containing powdered dielectric glass, a binder, and a solvent. Next, protective layer 9 made of magnesium oxide (MgO) is formed on dielectric layer 8 by vacuum deposition. With these steps, predetermined structural members are formed on front glass substrate 3. Thus, front panel 2 is completed.

On the other hand, rear panel 10 is formed in the following process. First, a material layer to be a structure for address electrodes 12 is made by silk-screening a paste containing silver (Ag) material on rear glass substrate 11, or forming a metal layer on the entire rear glass substrate followed by patterning the layer by the photolithography method. Then, the structure is fired at a desired temperature, to form address electrodes 12. Next, on rear glass substrate 11 having address electrodes 12 formed thereon, a dielectric paste is applied to cover address electrodes 12 by the die coat method or the like, to form a dielectric paste layer. Thereafter, the dielectric paste layer is fired into primary dielectric layer 13. The dielectric paste is a paint containing powdered dielectric glass, a binder, and a solvent.

Next, a paste containing a barrier rib, material for forming barrier ribs is applied to primary dielectric layer 13 and patterned into a predetermined shape to form a barrier rib material layer. Then, the material layer is fired to form barrier ribs 14. The usable methods of patterning the barrier rib paste applied to primary dielectric layer 13 include the photolithography method and sandblast method. Next, a phosphor paste containing a phosphor material is applied to primary dielectric layer 13 between adjacent barrier ribs 14 and the side surfaces of barrier ribs 14 and fired, to form phosphor layers 15. With these steps, predetermined structural members are formed on rear glass substrate 11. Thus, rear panel 10 is completed.

Front panel 2 and rear panel 10 including predetermined structural members manufactured as above are faced with each other so that scan electrodes 4 are orthogonal to address electrodes 12. Then, the peripheries of the panels are sealed with glass frits, and a discharge gas including Ne and Xe is charged into discharge space 16. Thus, PDP 1 is completed.

Next, a detailed description is provided of display electrodes 6 and dielectric layer 8 of front panel 2. First, display electrodes 6 are described. Indium oxide (ITO) having a thickness of approx. 12 μm is sputtered on the entire surface of front glass substrate 3, and formed into stripe-like transparent electrodes 4*a* and 5*a* having a width of 150 μm by the photolithography method. Next, a photosensitive paste is applied to the entire surface of front glass substrate 3 by printing or other methods, to form a black electrode paste layer. The photosensitive paste contains the following components: 70 to 90 wt % of black metallic fine particles or metallic oxide made of one element selected from a group consisting of iron (Fe), cobalt (Co), nickel (Ni), manganese (Mn), ruthenium (Ru), and rhodium (Rd); 1 to 15 wt % of binding glass; and 8 to 15 wt % of photosensitive organic binder components including a photosensitive polymer, a photosensitive monomer, a photo-polymerization initiator, and a solvent. The binding glass of the black electrode paste contains 20 to 50 wt % of at least bismuth oxide ($Bi_2O_3$), and has a softening point exceeding 550° C.

Next, a photosensitive paste is applied to the black electrode paste layer by printing or other methods, to form a white electrode paste layer. The photosensitive paste contains the following components: 70 to 90 wt % of at least silver (Ag) particles; 1 to 15 wt % of binding glass; and 8 to 15 wt % of photosensitive organic binder components including a photosensitive polymer, a photosensitive monomer, a photo-polymerization initiator, and a solvent. The binding glass of the white electrode paste layer contains 20 to 50 wt % of at least bismuth oxide ($Bi_2O_3$), and has a softening point exceeding 550° C.

These black electrode paste layer and white electrode paste layer both applied to the entire surface are patterned by the photolithography method, and fired at a temperature ranging from 550 to 600° C. Thus formed on transparent electrodes 4*a* and 5*a* are black electrodes 41*b* and 51*b* and white electrodes 42*b* and 52*b*, each having a line width of approx. 60 μm.

As described above, preferably, the binding glass for use in black electrodes 41*b* and 51*b* and white electrodes 42*b* and 52*b* contains 20 to 50 wt % of bismuth oxide ($Bi_2O_3$), and 0.1 to 7 wt % of at least one of molybdenum trioxide ($MoO_3$) and tungstic trioxide ($WO_3$). In place of molybdenum trioxide ($MoO_3$) and tungstic trioxide ($WO_3$), the binding glass may contain 0.1 to 7 wt % of at least one selected from cerium dioxide ($CeO_2$), cupper oxide (CuO), manganese dioxide ($MnO_2$), chromium oxide ($Cr_2O_3$), cobalt oxide ($Co_2O_3$), vanadium oxide ($V_2O_7$), and antimony oxide ($Sb_2O_3$).

In addition to the above components, the binding glass may contain components other than lead, such as 0 to 40 wt % of zinc oxide (ZnO), 0 to 35 wt % of boron oxide ($B_2O_3$), 0 to 15 wt % of silicon dioxide ($SiO_2$), and 0 to 10 wt % of aluminum oxide ($Al_2O_3$). The contents of these components are not specifically limited, and are within the range of the contents in the conventional arts.

In the present invention, the softening point of the binding glass is at least 550° C., and the firing point thereof ranges from 550 to 600° C. For conventional binding glass having a low softening point ranging from 450 to 550° C., highly-reactive bismuth oxide ($Bi_2O_3$) intensely reacts with silver (Ag), black metallic particles, or organic binder components in the paste, at a firing temperature almost 100° C. higher than the softening point. This reaction generates bubbles in metal bus electrodes 4*b* and 5*b* and dielectric layer 8, degrades the dielectric strength of dielectric layer 8. In contrast, for the binding glass of the present invention having a softening point of 550° C. or higher, the reactivity of silver (Ag), black metallic particles, or organic components with bismuth oxide ($Bi_2O_3$) is not so intense and causes less foaming. However, at a softening point of 600° C. or higher, the adherence of metal bus electrodes 4*b* and 5*b* to transparent electrodes 4*a* and 5*a*, front glass substrate 3, or dielectric layer 8 is decreased. Thus, such a softening point is not preferable.

A detailed description is provided of first dielectric layer 81 and second dielectric layer 82 constituting dielectric layer 8 of front panel 2. The dielectric material of first dielectric layer 81 is composed of the following components: 20 to 40 wt % of bismuth oxide ($Bi_2O_3$); 0.5 to 15 wt % of calcium oxide (CaO); and 0.1 to 7 wt % of at least one selected from molybdenum trioxide ($MoO_3$), tungstic trioxide ($WO_3$), cerium dioxide ($CeO_2$), and manganese dioxide ($MnO_2$).

Further, the dielectric material contains 0.5 to 12 wt % of at least one selected from strontium oxide (SrO) and barium oxide (BaO).

In place of molybdenum trioxide ($MoO_3$), tungstic trioxide ($WO_3$), cerium dioxide ($CeO_2$), and manganese dioxide ($MnO_2$), the dielectric material may contain 0.1 to 7 wt % of at least one selected from cupper oxide (CuO), chromium oxide ($Cr_2O_3$), cobalt oxide ($Co_2O_3$), vanadium oxide ($V_2O_7$), and antimony oxide ($Sb_2O_3$).

In addition to the above components, the dielectric material may contain components other than lead, such as 0 to 40 wt % of zinc oxide (ZnO), 0 to 35 wt % of boron oxide ($B_2O_3$), 0 to 15 wt % of silicon dioxide ($SiO_2$), and 0 to 10 wt % of aluminum oxide ($Al_2O_3$). The contents of these components are not specifically limited, and are within the range of the contents in the conventional arts.

The dielectric material having such composition is pulverized with a wet jet mill or ball mill to have an average particle diameter ranging from 0.5 to 2.5 μm, to provide a dielectric material powder. Next, 55 to 70 wt % of this dielectric material powder and 30 to 45 wt % of binder components are sufficiently kneaded with a three-roll kneader, to provide a paste of the first dielectric layer for die coat or printing. The binder components include ethylcellulose, terpioneol containing 1 to 20 wt % of acrylate resin, or butyl carbitol acetate. As needed, the paste may additionally contain dioctyl phthalate, dibutyl phthalate, triphenyl phosphate, or tributyl phosphate, as a plasticizer, and glycerol monooleate, sorbitan sesquioleate, or alkyl aryl phosphate esters, as a dispersant, to improve printability.

Next, the paste of the first dielectric layer is applied to front glass substrate 3 to cover display electrodes 6 by the die coat or silk-screen printing method, and dried. Thereafter, the paste is fired at a temperature ranging from 575 to 590° C., slightly higher than the softening point of the dielectric material, to provide first dielectric layer 81.

Next, a description is provided of second dielectric layer 82. The dielectric material of second dielectric layer 82 is composed of the following components: 11 to 40 wt % of bismuth oxide ($Bi_2O_3$); 6.0 to 28 wt % of barium oxide (BaO); and 0.1 to 7 wt % of at least one selected from molybdenum trioxide ($MoO_3$), tungstic trioxide ($Wo_3$) cerium dioxide ($CeO_2$), and manganese dioxide ($MnO_2$).

The dielectric material further contains 0.8 to 17 wt % of at least one selected from calcium oxide (CaO) and strontium oxide (SrO).

In place of molybdenum trioxide ($MoO_3$), tungstic trioxide ($WO_3$), cerium dioxide ($CeO_2$), and manganese dioxide ($MnO_2$), the dielectric material may contain 0.1 to 7 wt % of at least one selected from cupper oxide (CuO), chromium oxide ($Cr_2O_3$), cobalt oxide ($Co_2O_3$), vanadium oxide ($V_2O_7$), and antimony oxide ($Sb_2O_3$).

In addition to the above components, the dielectric material may contain components other than lead, such as 0 to 40 wt % of zinc oxide (ZnO), 0 to 35 wt % of boron oxide ($B_2O_3$), 0 to 15 wt % of silicon dioxide ($SiO_2$), and 0 to 10 wt % of aluminum oxide ($Al_2O_3$). The contents of these components are not specifically limited, and are within the range of the contents in the conventional arts.

The dielectric material having such composition is pulverized with a wet jet mill or ball mill to have an average particle diameter ranging from 0.5 to 2.5 μm, so that a dielectric material powder is provided. Next, 55 to 70 wt % of this dielectric material powder and 30 to 45 wt % of binder components are sufficiently kneaded with a three-roll kneader, to provide a paste of the second dielectric layer for die coat or printing. The binder components include ethylcellulose, terpioneol containing 1 to 20 wt % of acrylate resin, or butyl carbitol acetate. As needed, the paste may additionally contain dioctyl phthalate, dibutyl phthalate, triphenyl phosphate, or tributyl phosphate, as a plasticizer, and glycerol monooleate, sorbitan sesquioleate, or alkyl aryl phosphate esters, as a dispersant, to improve printability.

Next, the paste of the second dielectric layer is applied to first dielectric layer 81 by the silk-screen printing method or the die coat method, and dried. Thereafter, the paste is fired at a temperature ranging from 550 to 590° C., slightly higher than the softening point of the dielectric material, to provide second dielectric layer 82. Thus, dielectric layer 8 is formed.

The advantage of increasing the brightness of the panel and decreasing the discharge voltage is more distinct at the smaller thickness of dielectric layer 8. For this reason, preferably, the thickness is as small as possible within the range in which the dielectric voltage does not decrease. From the viewpoints of these conditions and visible-light transmittance, in this exemplary embodiment of the present invention, the thickness of dielectric layer 8 is up to 41 μm, with that of first dielectric layer 81 ranging from 5 to 15 μm and that of second dielectric layer 82 ranging from 20 to 36 μm.

For second dielectric layer 82 with a content of bismuth oxide ($Bi_2O_3$) up to 11 wt %, coloring is unlikely to occur, but bubbles are likely to foam in second dielectric layer 82. Thus, such a content is not preferable. With a content of bismuth oxide ($Bi_2O_3$) exceeding 40 wt %, coloring is likely to occur. For this reason, such a content is not preferable to increase the transmittance.

Further, it is necessary that there should be a difference in the content of bismuth oxide ($Bi_2O_3$) between first dielectric layer 81 and second dielectric layer 82. This is confirmed by the following phenomenon. When the content of bismuth oxide ($Bi_2O_3$) is the same in first dielectric layer 81 and second dielectric layer 82, the bubbles generated in first dielectric layer 81 also generates bubbles in second dielectric layer 82 during the step of firing second dielectric layer 82.

When the content of bismuth oxide ($Bi_2O_3$) in second dielectric layer 82 is smaller than that of bismuth oxide ($Bi_2O_3$) in first dielectric layer 81, the following advantage is given. Because second dielectric layer 82 accounts for at least approx. 50% of the total thickness of dielectric layer 8, coloring of yellowed metallic color is unlikely to occur and the transmittance can be increased. Additionally, because the Bi-based materials are expensive, the cost of the raw materials to be used can be reduced.

On the other hand, when the content of bismuth oxide ($Bi_2O_3$) in second dielectric layer 82 is larger than the content of bismuth oxide ($Bi_2O_3$) in the first dielectric layer, the softening point of second dielectric layer 82 can be lowered and thus removal of bubbles in the firing step can be promoted.

It is confirmed that a PDP manufactured in this manner can provide front glass substrate 3 having a minimized coloring (yellowing) phenomenon, and dielectric layer 8 having no bubbles generated therein and an excellent dielectric strength, even with the use of a silver (Ag) material for display electrodes 6.

Next, consideration is given to the reasons why these dielectric materials inhibit yellowing or foaming in first dielectric layer 81, in a PDP in accordance with the exemplary embodiment of the present invention. It is known that addition of molybdenum trioxide ($MoO_3$) or tungstic trioxide ($WO_3$) to dielectric glass containing bismuth oxide ($Bi_2O_3$) is likely to generate compounds, such as $Ag_2MoO_4$, $Ag_2Mo_2O_7$, $Ag_2Mo_4O_{13}$, $Ag_2WO_4$, $Ag_2W_2O_7$, and $Ag_2W_4O_{13}$, at low temperatures up to 580° C. In the exemplary embodiment of the present invention, the firing temperature of dielectric layer 8 ranges from 550 to 590° C. Thus, silver ions ($Ag^+$) diffused in dielectric layer 8 during firing react with molybdenum trioxide ($MoO_3$), tungstic trioxide ($WO_3$), cerium dioxide ($CeO_2$), or manganese dioxide ($MnO_2$) in dielectric layer 8, generate stable compounds, and stabilize. In other words, because the silver ions ($Ag^+$) are not reduced and are stabilized, the ions do not coagulate into colloids. Consequently, the stabilization of the silver ions ($Ag^+$) decreases oxygen generated by colloidization of silver (Ag), thus reducing the bubbles generated in dielectric layer 8.

On the other hand, preferably, the content of molybdenum trioxide ($MoO_3$), tungstic trioxide ($WO_3$), cerium dioxide ($CeO_2$), or manganese dioxide ($MnO_2$) in the dielectric glass containing bismuth oxide ($Bi_2O_3$) is at least 0.1 wt %, to offer these advantages. More preferably, the content ranges from 0.1 to 7 wt %. Particularly with a content up to 0.1 wt %, the advantage of inhibiting yellowing is smaller. With a content of at least 7 wt %, yellowing occurs in the glass, and thus is not preferable.

Calcium oxide (CaO) contained in the first dielectric layer works as an oxidizer in the firing step of the first dielectric layer, and has an effect of promoting removal of binder components remaining in the electrodes. On the other hand, barium oxide (BaO) contained in the second dielectric layer has an effect of increasing the transmittance of the second dielectric layer.

In other words, for dielectric layer 8 of PDP 1 in accordance with the exemplary embodiment of the present invention, first dielectric layer 81 in contact with metal bus electrodes **4*b* and 5*b* made of a silver (Ag) material inhibits the yellowing phenomenon and foaming therein, and second dielectric layer 82 provided on first dielectric layer 81 achieves high light transmittance. Further, the binding glass of black electrodes 41*b* and 51*b* and while electrodes 42*b* and 52*b* contains 20 to 50 wt % of at least bismuth oxide ($Bi_2O_3$), and has a softening point exceeding 550° C. Thus, foaming from metal bus electrodes 4*b* and 5*b* can further be inhibited. This structure can provide a PDP that has extremely minimized foaming and yellowing, and high transmittance in the entire dielectric layer 8**.

In PDP 1 in accordance with the exemplary embodiment of the present invention, when address electrodes 12 are formed on rear glass substrate 11 of rear panel 10, address electrodes 12 contain at least silver (Ag) and binding glass, and the binding glass contains at least bismuth oxide ($Bi_2O_3$) and has a softening point exceeding 550° C. In similar to the relation between metal bus electrodes **4*b* and 5*b* and dielectric layer 8** as described above, this structure inhibits foaming during formation of address electrodes 12, and improves the dielectric strength of primary dielectric layer 13 and thus the reliability of rear panel 10.

EXAMPLES

As PDPs in accordance with this exemplary embodiment of the present invention, PDPs suitable for a high definition television screen approx. 42 inch in diagonal are fabricated and their performances are evaluated. Each of the PDPs includes discharge cells having 0.15-mm-high barrier ribs at a regular spacing (cell pitch) of 0.15 mm, display electrodes at a regular spacing of 0.06 mm, and a Ne—Xe mixed gas containing 15 vol % of Xe charged at a pressure of 60 kPa.

Table 1 shows samples of the binding glass constituting black electrodes 41*b* and 51*b* and while electrodes 42*b* and 52*b* in metal bus electrodes 4*b* and 5*b*. Each sample has different compositions. Table 2 shows samples of the dielectric glass of first dielectric layer 81 having different compositions. Table 3 shows samples of the dielectric glass of second dielectric layer 82 having different compositions. Table 4 shows PDPs fabricated by combination of these dielectric layers, and the evaluation results thereof. In Table 1, the binding glass compositions of sample Nos. 8 and 9 are comparative examples in the present invention. The dielectric glass of sample Nos. A12 and A13 in Table 2, and that of sample Nos. B11 and B12 in Table 3 have compositions outside the preferable range of the present invention. As a result, panel Nos. 27 through 32 using these materials are comparative examples in the present invention.

TABLE 1

| Composition of dielectric glass | Sample No. of binding glass for black electrode and white electrode | | | | | | | | |
|---|---|---|---|---|---|---|---|---|---|
| (wt %) | 1 | 2 | 3 | 4 | 5 | 6 | 7 | 8* | 9* |
| $Bi_2O_3$ | 23 | 30 | 28 | 40 | 50 | 35 | 45 | 15 | 72 |
| CaO | — | 3.1 | — | 8.1 | — | — | — | — | — |
| SrO | — | 1.8 | — | — | — | — | — | — | — |
| BaO | 6.4 | 1.5 | 4.8 | — | — | — | — | — | 4.0 |
| $MoO_3$ | 0.8 | 0.2 | 0.3 | 0.5 | — | 7.0 | 0.1 | 1.0 | — |
| $WO_3$ | — | — | — | 1.0 | 1.0 | — | 3.8 | — | — |
| Other components** | 70 | 63 | 67 | 50 | 49 | 58 | 51 | 84 | 24 |
| Softening point (° C.) | 597 | 566 | 560 | 565 | 551 | 564 | 559 | 610 | 460 |

*Sample Nos. 8 and 9 are comparative examples.
**"Other components" do not include lead.

TABLE 2

| Composition of dielectric glass | Sample No. of first dielectric layer | | | | | | | | | | | | |
|---|---|---|---|---|---|---|---|---|---|---|---|---|---|
| (wt %) | A1 | A2 | A3 | A4 | A5 | A6 | A7 | A8 | A9 | A10 | A11 | A12* | A13* |
| $Bi_2O_3$ | 25 | 27 | 35 | 31 | 40 | 31 | 23 | 22 | 20 | 25 | 27 | 15 | 35 |
| CaO | — | 2.5 | 6.0 | 9.0 | 8.1 | 12 | 12 | 0.5 | 3.8 | 2.4 | 15 | — | 8.0 |
| SrO | 3.3 | 0.9 | — | — | — | — | — | — | 12 | — | — | — | — |
| BaO | — | 1.6 | 7.0 | — | — | — | — | 11 | — | 0.5 | — | — | 7.0 |
| $MoO_3$ | 4.0 | 0.5 | 2.0 | 0.5 | 0.5 | 3.0 | 0.3 | 0.5 | 0.1 | — | — | 2.0 | — |
| $WO_3$ | 3.0 | — | — | — | 1.0 | — | — | — | 7.0 | — | 3.0 | 5.0 | — |
| $CeO_2$ | — | — | — | — | — | — | — | 1.0 | — | 3.0 | — | — | — |
| $MnO_2$ | — | — | — | — | — | — | — | 5.0 | 0.7 | — | 1.0 | — | — |
| Other components** | 65 | 68 | 50 | 60 | 50 | 55 | 64 | 60 | 57 | 69 | 54 | 78 | 50 |

*Sample Nos. A12 and A13 are comparative examples.
**"Other components" include no lead.

TABLE 3

| Composition of dielectric glass | Sample No. of second dielectric layer | | | | | | | | | | | |
|---|---|---|---|---|---|---|---|---|---|---|---|---|
| (wt %) | B1 | B2 | B4 | B4 | B5 | B6 | B7 | B8 | B9 | B10 | B11* | B12* |
| $Bi_2O_3$ | 11 | 12 | 19 | 19 | 20 | 34 | 18 | 40 | 32 | 27 | 31 | 10 |
| CaO | 17 | 5.4 | — | 1.6 | 2.0 | — | — | — | — | 8.6 | 12 | — |
| SrO | — | — | — | — | 1.6 | — | — | — | 0.8 | — | — | — |
| BaO | 11 | 10 | 21 | 16 | 6.0 | 16 | 24 | 18 | 22 | 28 | — | 14 |
| $MoO_3$ | 2.0 | — | — | — | — | — | 0.7 | — | — | 1.7 | 3.0 | — |

TABLE 3-continued

| Composition of dielectric glass | Sample No. of second dielectric layer | | | | | | | | | | | |
|---|---|---|---|---|---|---|---|---|---|---|---|---|
| (wt %) | B1 | B2 | B4 | B4 | B5 | B6 | B7 | B8 | B9 | B10 | B11* | B12* |
| $WO_3$ | — | 7.0 | — | 0.7 | — | — | — | 0.8 | 3.2 | — | — | — |
| $CeO_2$ | 0.1 | 1.0 | 1.0 | 3.0 | 0.2 | 0.3 | 0.3 | — | — | — | — | — |
| $MnO_2$ | — | — | — | — | — | — | — | 0.7 | — | 2.3 | — | — |
| $Li_2O$ | — | — | — | — | — | 0.7 | — | 0.5 | 0.8 | 1.3 | — | — |
| Other components** | 60 | 65 | 59 | 60 | 70 | 49 | 57 | 40 | 41 | 31 | 55 | 77 |

*Sample Nos. B11 and B12 are comparative examples.
**"Other components" include no lead.

TABLE 4

| Panel No. | Sample No. of binding glass for black electrode and white electrode | Sample No. of second dielectric layer/ Sample No. of first dielectric layer | Thickness of second dielectric layer/ Thickness of first dielectric layer (μm) | Transmittance of dielectric layer(%) | b* value | PDPs with dielectric breakdown after accelerated life tests (pcs) |
|---|---|---|---|---|---|---|
| 1 | No. 1 | No. B1/No. A1 | 20/15 | 90 | 1.8 | 0 |
| 2 | No. 1 | No. B2/No. A2 | 26/13 | 89 | 1.9 | 0 |
| 3 | No. 1 | No. B3/No. A3 | 30/10 | 87 | 1.9 | 0 |
| 4 | No. 2 | No. B4/No. A4 | 26/14 | 88 | 2 | 0 |
| 5 | No. 2 | No. B5/No. A5 | 35/5 | 89 | 2.8 | 0 |
| 6 | No. 2 | No. B1/No. A6 | 23/15 | 86 | 2 | 0 |
| 7 | No. 2 | No. B6/No. A7 | 25/10 | 88 | 1.9 | 0 |
| 8 | No. 6 | No. B7/No. A8 | 25/10 | 87 | 1.8 | 0 |
| 9 | No. 6 | No. B8/No. A9 | 25/10 | 88 | 2.1 | 0 |
| 10 | No. 6 | No. B9/No. A10 | 25/10 | 89 | 2.1 | 0 |
| 11 | No. 6 | No. B10/No. A11 | 25/10 | 88 | 1.9 | 0 |
| 12 | No. 3 | No. B2/No. A3 | 28/10 | 88 | 2.1 | 0 |
| 13 | No. 3 | No. B3/No. A4 | 25/10 | 91 | 2 | 0 |
| 14 | No. 3 | No. B4/No. A5 | 25/10 | 87 | 2.4 | 0 |
| 15 | No. 4 | No. B5/No. A6 | 25/10 | 88 | 2.2 | 0 |
| 16 | No. 4 | No. B7/No. A7 | 25/10 | 89 | 1.8 | 0 |
| 17 | No. 7 | No. B8/No. A8 | 25/10 | 87 | 1.9 | 0 |
| 18 | No. 7 | No. B9/No. A9 | 25/10 | 88 | 1.7 | 0 |
| 19 | No. 7 | No. B10/No. A10 | 25/10 | 88 | 1.9 | 0 |
| 20 | No. 7 | No. B1/No. A11 | 25/10 | 91 | 1.8 | 0 |
| 21 | No. 4 | No. B1/No. A3 | 25/10 | 90 | 2 | 0 |
| 22 | No. 4 | No. B5/No. A4 | 25/12 | 89 | 2.4 | 0 |
| 23 | No. 5 | No. B3/No. A5 | 25/10 | 88 | 2.5 | 0 |
| 24 | No. 5 | No. B3/No. A6 | 25/12 | 87 | 2.1 | 0 |
| 25 | No. 5 | No. B2/No. A1 | 25/10 | 91 | 1.8 | 0 |
| 26 | No. 1 | No. B3/No. A1 | 22/15 | 88 | 2 | 0 |
| 27* | No. 2 | No. B1/No. A12 | 25/10 | 91 | 2.1 | 3 |
| 28* | No. 3 | No. B3/No. A13 | 25/10 | 87 | 13.4 | 2 |
| 29* | No. 4 | No. B11/No. A6 | 25/10 | 83 | 2.8 | 4 |
| 30* | No. 5 | No. B12/No. A3 | 25/10 | 90 | 2 | 3 |
| 31* | No. 8 | No. B1/NoA3 | 25/10 | 91 | 2.1 | 2 |
| 32* | No. 9 | No. B1/NoA3 | 25/10 | 90 | 3.2 | 6 |

*Panel Nos. 27 through 30 are comparative examples.

These PDPs of panel Nos. 1 through 32 are fabricated and evaluated for the following items. Table 4 shows the evaluation results. First, the visible-light transmittance of front panel 2 is measured using a spectrometer. Each of the measurement results shows an actual transmittance of dielectric layer 8 after subtraction of the transmittance of front glass substrate 3 and the influence of the electrodes.

The degree of yellowing caused by silver (Ag) is measured with a colorimeter (CR-300 made by Minolta Co., Ltd.) to provide a b*value that indicates the degree of yellowing. As a threshold of the b*value at which yellowing affects the display performance of the PDP, b*=3. When the value is larger, yellowing is more conspicuous, the color temperature is lower, and the PDP is less preferable.

Further, 20 pieces of PDPs are fabricated for each of panel Nos. 1 through 32, and accelerated life tests are conducted on these PDPs. The accelerated life tests are conducted by discharging the PDPs at a discharge sustain voltage of 200V and a frequency of 50 kHz for 4 hours continuously. Thereafter, the number of PDPs of which dielectric layer 8 has broken (dielectric voltage defect) is determined. Because the dielectric voltage defect is caused by such failures as bubbles generated in dielectric layer 8, it is considered that many bubbles have foamed in the panels having dielectric breakdown produced therein.

Results of Table 4 show, for the PDPs of panel Nos. 1 through 26 corresponding to those of this exemplary embodiment of the present invention, yellowing or foaming caused by silver (Ag) is inhibited, to provide high visible-light transmittances of the dielectric layer ranging from 87 to 91% and b*values concerning yellowing as low as 1.7 to 2.8, and no dielectric breakdown has occurred after the accelerated life tests.

In contrast, for panel No. 32 that uses binding glass sample No. 9 having a low softening point outside the composition range of the binding glass for the metal bus electrodes of the present invention, the number of generated bubbles is abnormally large, thus increasing the number of panels having dielectric breakdown produced after the accelerated life tests. For panel No. 31 that uses binding glass sample No. 8 having a high softening point, weak adherence of the metal bus electrodes to the transparent electrodes and dielectric layer causes such phenomena as peeling and increases in the bubbles generated in the interfaces thereof. In other words, preferably, the softening point of the metal bus electrodes ranges from 550 to 600° C. When the compositions of the binding glass of the metal bus electrodes are within the range of the present invention, but the compositions of the first dielectric layer and the second dielectric layer are outside the range and combination of the present invention, foaming and yellowing increase as shown in panel Nos. 27, 28, 29, and 30. Consequently, it is preferable to optimize the binding glass of the metal bus electrodes, and the dielectric glass of the dielectric layer formed on the metal bus electrodes.

As described above, a PDP in accordance with the exemplary embodiment of the present invention can provide a front panel having high visible-light transmittance and high dielectric strength, and a rear panel having high dielectric strength, thus achieving a reliable, lead (Pb)-free, eco-friendly PDP.

INDUSTRIAL APPLICABILITY

As described above, the present invention provides an eco-friendly PDP with excellent display quality that includes a dielectric layer having minimized yellowing and dielectric strength deterioration. Thus, the PDP is useful for a large-screen display device and the like.

The invention claimed is:

1. A plasma display panel (PDP) comprising:

a front panel including display electrodes, a dielectric layer, and a protective layer that are formed on a glass substrate; and a rear panel including address electrodes, barrier ribs, and phosphor layers that are formed on a substrate, wherein the front panel and the rear panel are faced with each other, and peripheries of the front panel and the rear panel being sealed to form a discharge space therebetween, wherein:

each of the display electrodes includes a metal electrode including a black electrode and a white electrode layered over the black electrode, the white electrode includes at least silver and a first binding glass, the first binding glass of the white electrode includes 20 wt% or more to less than 30 wt% of the bismuth oxide and includes 0.1 wt% to 7 wt% (inclusive) of at least one of molybdenum trioxide and tungstic trioxide therein and has a softening point exceeding 550° C., and the black electrode contains a second binding glass and metallic fine particles or metallic oxide made of at least one element selected from a group consisting of iron (Fe), cobalt (Co), nickel (Ni), manganese (Mn), ruthenium (Ru), and rhodium (Rd).

* * * * *